United States Patent
Stacklies (10) Patent No.: US 7,164,964 B2
(45) Date of Patent: Jan. 16, 2007

(54) METHOD FOR PRODUCING AN ASPHERICAL OPTICAL ELEMENT

(75) Inventor: Siegfried Stacklies, Brucknerweg (DE)

(73) Assignee: Carl Zeiss SMT AG, Oberkochen (DE)

( * ) Notice: Subject to any disclaimer, the term of this patent is extended or adjusted under 35 U.S.C. 154(b) by 57 days.

(21) Appl. No.: 10/874,070

(22) Filed: Jun. 22, 2004

(65) Prior Publication Data

US 2005/0177270 A1    Aug. 11, 2005

Related U.S. Application Data (63) Continuation-in-part of application No. PCT/EP04/01193, filed on Feb. 10, 2004.

(51) Int. Cl.
*G06F 19/00* (2006.01)

(52) U.S. Cl. .................. 700/164; 700/182; 451/5

(58) Field of Classification Search ................ 700/164, 700/182; 451/5; 378/59
See application file for complete search history.

(56) References Cited

U.S. PATENT DOCUMENTS

| | | | |
|---|---|---|---|
| 4,733,502 A * | 3/1988 | Braun ......................... 451/42 |
| 5,187,728 A * | 2/1993 | Vaughn ....................... 378/59 |
| 5,777,970 A * | 7/1998 | Kajiyama et al. .......... 369/53.2 |
| 6,112,133 A | 8/2000 | Fishman ..................... 700/182 |
| 6,224,469 B1 * | 5/2001 | Ohmori et al. ............... 451/56 |
| 6,632,123 B1 * | 10/2003 | Nienhaus ....................... 451/5 |
| 6,889,112 B1 * | 5/2005 | Endoh et al. ............... 700/164 |
| 2004/0058466 A1 * | 3/2004 | Ushijima et al. ............. 438/31 |

FOREIGN PATENT DOCUMENTS

| EP | 0 790 101 A1 | 8/1997 |
|---|---|---|
| JP | 7068456 | 3/1995 |
| JP | 2002011656 A * | 1/2002 |

* cited by examiner

*Primary Examiner*—Kidest Bahta
(74) *Attorney, Agent, or Firm*—GrayRobinson, P.A.

(57) ABSTRACT

The invention relates to a program-controlled NC data generating method for controlling a CNC wet-grinding machine for machining workpieces made of optical materials to produce aspherical forms, the data of the aspherical forms to be ground being overlaid with correction data.

25 Claims, 5 Drawing Sheets

Grinding data generation

Pgen 1: c:\temp\p01.cnc
dx [mm]: 0.1000

Pgen 2:
Dlens [mm]: 133.00

Pgen 3: 140.000 [mm]

Pgen 4: 122.000

Pgen 5: 124.000 rp: -107.46000 ro: -82.47034
ex: 0.97893500
C1: 6.9712220E-7
C2: -3.6136560E-10
C3: 1.4630790E-13
C4: -2.3770832E-17
C5: 7.3122290E-22
C6: 0.0000000E+0
C7: 0.0000000E+0 nmax [U/rpm]: 500.00
nedge [U/rpm]: 50.00

Zmax: 0.000100
Zmin: 0.001000 a1: -106.3582840000
a2: 0.0000000000
a3: -105.6647920000
a4: 1.0000

Gasph

GXA-XP

Gcorrection

Gslope

Pcontour

| | | | | | | x |
|---|---|---|---|---|---|---|
| 0 | 66.5 | 66.4 | 66.3 | 66.2 | 66.1 | 66.0 |
| 0 | -22.66 | -22.58 | -22.50 | -22.42 | -22.34 | -22.26 y |
| | -0.798 | -0.796 | -0.794 | -0.792 | -0.790 | -0.788 y' |

Pcorrection

| 880 | 0.0000 | 0.0000 | 0.0000 | 0.0000 | 0.0000 | 0.0000 |
|---|---|---|---|---|---|---|

START    OK   Cancel

METHOD FOR PRODUCING AN ASPHERICAL OPTICAL ELEMENT

CROSS REFERENCE TO RELATED APPLICATIONS

This is a continuation-in-part of International Application No. PCT/EP04/01193 filed Feb. 10, 2004 which designated the U.S. and to which priority is claimed under 35 U.S.C. § 120.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable.

INCORPORATION BY REFERENCE OF MATERIAL SUBMITTED ON A COMPACT DISC

Not applicable.

BACKGROUND OF THE INVENTION

1. Field of the Invention

The invention relates to a program-controlled NC data generating method for controlling a CNC wet-grinding machine.

2. Description of Related Art

Although known optical grinding machines allow possibilities for the input of aspherical forms, they offer only very limited possibilities for modification, correction and movement dynamics. Grinding results previously achieved with such machines generally did not satisfy the requirements that exact aspherical forms have to meet. Owing to dimensional deviations of up to 10 µm and inadequate correction possibilities, frequently only by means of a few interpolation points, often to be input manually, effective series production of highly accurate aspheres, in particular aspherical lenses, is rarely possible or not possible at all.

The so-called depression in the center of the workpiece is particularly problematical. The grinding tool or the grinding wheel of a CNC grinding machine, in particular a CNC wet-grinding machine, cannot move away from the center of the asphere infinitely quickly, it is limited in its dynamics. Even an extremely short dwell time of the grinding wheel in the center (even in the range of milliseconds) can cause a hole or a depression at the center of the lens. This problem is also referred to as the center hole effect.

For mathematical reasons, every asphere has the characteristic of steeply rising increasingly toward the edge, i.e. of course also toward the runout region lying outside the useful aspherical region. This on the one hand increases the deformation and, since the grinding/polishing tool also adapts itself to the deformations in a disadvantageous way, is accompanied by great problems, which can have effects extending into the useful region of the asphere. In addition, in the case of concave forms, the useful surface area may be ground into, i.e. destroyed, by the grinding tool.

BRIEF SUMMARY OF THE INVENTION

The present invention is therefore based on the object of providing a program-controlled PC data generating method of the type mentioned at the beginning by which the disadvantages of the prior art are overcome; in particular, an improvement in the accuracy of the asphere grinding results is to be achieved, in order to permit effective series production of highly accurate optical aspheres, it being intended to avoid or correct central depressions and steep asphere runout regions.

This object is achieved according to the invention by a program-controlled NC data generating method for controlling a CNC wet-grinding machine for machining workpieces made of optical materials to produce aspherical forms, the data of the aspherical forms to be ground being overlaid with correction data.

A program-controlled NC data generating method for controlling a CNC wet-grinding machine for machining workpieces made of optical materials to produce aspherical forms which achieves high levels of accuracy with respect to the form and structure of the aspheres is achieved by the measures according to the invention. The grinding results achieved form the basis for cost-effective production of highly accurate aspherical surfaces with great deformations of over 1 mm both for lighting systems and for lenses with an accuracy in the µm range. This aim is achieved on the one hand by a specific advancement/workpiece rotational speed profile (hyperbolic) and on the other hand by a possible correction overlay.

In a refinement of the invention in terms of the method, it may also be provided that the correction data are used for producing a runout region, in particular a flattened runout region, outside the useful aspherical region of the workpiece.

Extending the method by including the possibility of providing runout regions for the aspheres to be produced is very advantageous. Special runout parameters to be input allow the region outside the asphere to be defined in such a way that a smooth transition from the aspherical form that is advantageous for polishing is achieved. The coefficients to be chosen allow profiles with splines, polynomials and circles. A kink-free connection to the asphere profile must take place here. Every asphere has the characteristic of steeply rising increasingly toward the edge. This on the one hand increases the deformation and, since the grinding/polishing tool also adapts itself to the large deformations, is accompanied by great problems, which can have effects extending into the useful region of the asphere. In addition, in the case of concave forms, the useful surface area may be ground into by the grinding tool. In a very advantageous way, this rise can then be flattened outside the useful region of the asphere, so that the deformations of the workpiece are minimized. It is also very advantageous if the correction data are used to avoid and/or correct a depression in the center of the workpiece.

To avoid depressions in the center of workpieces, caused by the dwell time before the grinding wheel lifts off, the center correction allowance of variable width is used in a very advantageous refinement of the method according to the invention. This correction ensures that a kink-free profile of the form is achieved. For this purpose, the aspherical form to be produced is provided with a hyperbolic form overlay. The overlay covers the entire height of the asphere, but only a small region in the center, the width of which is determined by a parameter, is effective. By overlaying the entire surface area of the asphere, it is ensured that there is no sudden change in the profile of the asphere. However, due to the machine resolution, only the small rising central region is effective in practice.

According to the invention, it may also be provided that the correction data are used for correcting erroneous deviations of the aspherical form produced from the desired form of the workpiece, in particular when there are a number of grinding cycles.

As a result, dimensional accuracies in the μm range can be achieved in an advantageous way by possible correction overlays from previous measurements of the errors, in particular when there are a number of grinding cycles. The errors or deviations from the desired form of the workpiece are measured in particular by precision coordinate-measuring machines, it additionally being possible for a smoothing of the measured values (for example interferometric measured values) to be carried out.

It is advantageous if a base radius for the spherical prefabrication of the workpiece is calculated in such a way that the spherical workpiece has the smallest possible deformation from the desired aspherical form.

The method allows the most effective sphere radius to be determined very quickly and then used as a base radius for the spherical prefabrication. This radius has the smallest possible deformation from the aspherical form, in order that the machining of the material or the polishing effort is kept down.

Advantageous refinements and developments of the invention emerge from the further subclaims and from the exemplary embodiment described in principle below on the basis of the drawing, in which:

BRIEF DESCRIPTION OF THE SEVERAL VIEWS OF THE DRAWINGS

FIG. 4b is a schematic illustration of the grinding wheel and workpiece of FIG. 4a illustrating movement of the grinding wheel center from point $M_1$ to point $M_3$ by way of point $M_2$, thus together with FIG. 4a, showing a basic representation of the tangent problem with the radius correction of the CNC wet-grinding machine switched on;

DETAILED DESCRIPTION OF THE INVENTION

Figure 1:
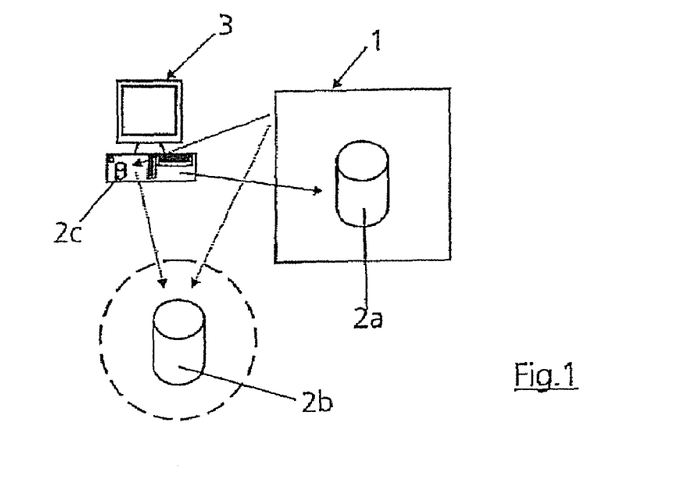
FIG. 1 shows a basic representation of a CNC wet-grinding machine with access to NC data generated in a program-controlled manner.

As represented in FIG. 1, a CNC wet-grinding machine 1 accesses NC data 2a, 2b, 2c (dotted arrows) in order to machine a workpiece; in the present exemplary embodiment it is intended to produce a lens with an aspherical form, in particular for use in projection lenses for microlithography for the production of semiconductor elements. The CNC wet-grinding machine 1 may receive the necessary NC data 2a from storage media of its own or by direct programming. Furthermore, the CNC grinding machine 1 could also obtain the NC data 2b in particular via a network (for example intranet, LAN or the like—indicated in FIG. 1 by dashed line) or via an RS232 interface from a server (not represented) or directly access the database 2c of a computer system 3. In the present exemplary embodiment, a computer program which implements the NC data generating method according to the invention runs on the computer system 3. In this case, NC data 2a, 2b, 2c for the production of an aspherical form are generated and made available to the CNC wet-grinding machine 1. The data links between the computer system 3 and the CNC wet-grinding machine 1 or the underlying network are sufficiently known, for which reason they are not discussed in any more detail.

Figure 2:
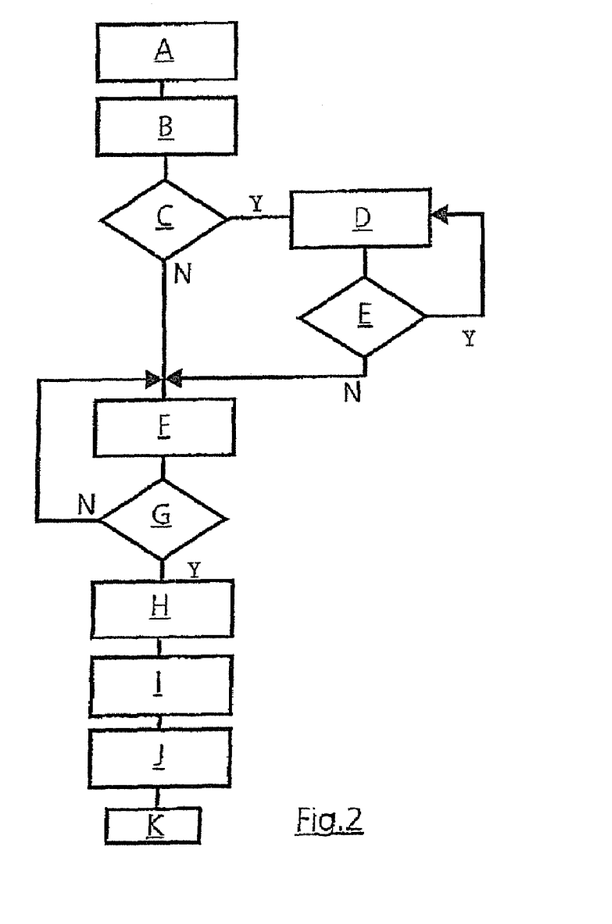
FIG. 2 shows a basic flow diagram of the program-controlled NC data generating method according to the invention.

FIG. 2 shows a basic flow diagram of the NC data generating method according to the invention, implemented as a computer program. After the start of the program (step A), the file name is input with the specific CNC wet-grinding machine data by the user at the user interface, in particular a graphical user interface, after which this file is opened and the machine-specific data are read (step B). In a step C, it is inquired whether a correction file with correction data is to be overlaid on the aspherical form data. If "Y" (yes) is selected, the user is requested in a step D to input the file name of the correction file, after which the correction file or the correction data located in it are read in. In a step E, the user is asked about using a further correction file; if "Y" (yes) is selected, control returns in a loop to activate step D. After all the correction files have been input, or "N" (no) has been selected in steps C and E, the method passes on to a step F, in which the geometry and machining parameters for producing the desired aspherical form are input. Subsequently, the user is asked in a step G to confirm the inputs he has entered. If he does not confirm the data (selecting "N" (no)), he returns to step F and can correct them if need be; if "Y" (yes) is selected, the levels of the interpolation points for the NC data generation are calculated in a step H, after which the NC data generation and the storing of the NC data in a file take place in a step I; this file 2a, 2b, 2c may be stored on a server or on the computer system 3 or, of course, also directly on a storage medium of the CNC wet-grinding machine 1. Subsequently, the data input by the user can be stored in a step J in a configuration file and be used directly during the next instance of use. After that, the computer program is ended (step K).

With the NC data generating method or computer program according to the invention, highly accurate aspheres can be produced, in particular aspherical lenses, with accuracies in the μm range by the possible correction overlays. This also allows in particular for the problems of an unwanted depression in the center of the workpiece (so-called center hole effect) and a steep runout region outside the useful region of the aspherical workpiece.

Figure 3:
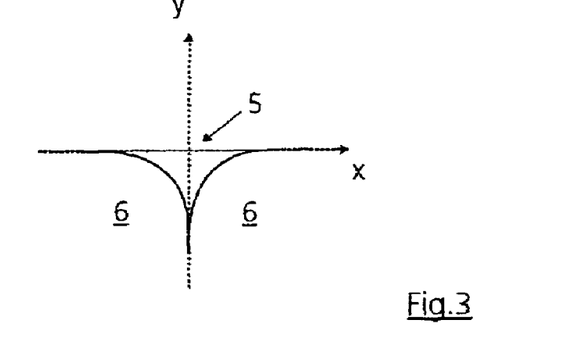
FIG. 3 shows a basic representation of a depression in the center of an aspherical workpiece.
Figure 4A:
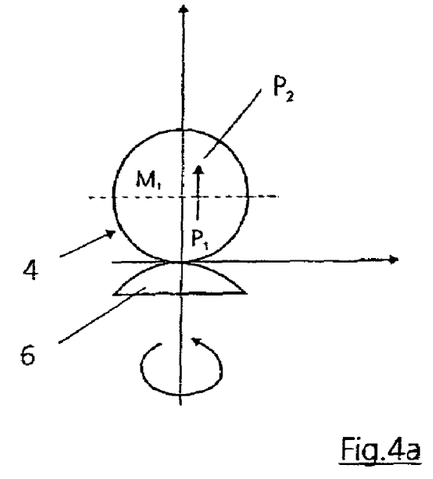
FIG. 4a is a schematic illustration of a the grinding wheel of a CNC wet-grinding machine in relation to a workpiece showing the grinding wheel initially centered at a point $M_1$.
Figure 4B:
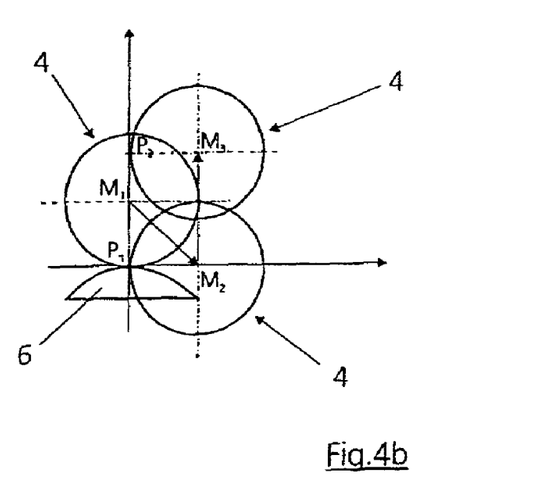

With the center hole effect (also referred to as "sparking out") of a grinding wheel 4 (represented in FIGS. 4a, 4b) of the CNC wet-grinding machine 1 in the center 5 of the workpiece 6, here an asphere, the center of the asphere is hollowed out in an unwanted manner (see FIG. 3) by the grinding wheel 4 being lifted off too slowly after the end of machining. In FIG. 3, the x-axis describes the height in mm and the y-axis the deviation in μm. The grinding wheel 4 cannot move away from the center of the aspherical workpiece 6 infinitely quickly, it is limited by its dynamics. Even a short dwell time of the grinding wheel 4 in the center (approximately in the milliseconds range) can cause a hole in an aspherical lens 6. The object is consequently to correct a center hole effect in the workpiece 6 due to the dwell time before the grinding wheel 4 is lifted off. This cannot be achieved during active grinding wheel radius correction by quickly moving the grinding wheel 4 away (in a further exemplary embodiment a different grinding tool may be provided instead of a grinding wheel 4, for example a cup grinding tool). In FIGS. 4a and 4b, this tangent problem is represented in principle with the radius correction of a CNC grinding machine, in particular the CNC wet-grinding machine 1, switched on. From a point $P_1$, with which it forms a tangent, the grinding wheel 4 can also only move tangentially to the point $P_2$. This means that the grinding wheel 4 first has to move with its center point from point $M_1$ to point $M_2$, as shown in FIG. 4a, to allow it then to move to point $M_3$. Only in this way is point $P_2$ moved to tangentially from position $P_1$. The workpiece 6 would be destroyed by this sequence of movements, as evident from FIG. 4b. This problem also arises if the aspherical form does not have a kink-free profile due to changes in its edge. It is then not ensured that the workpiece 6 won't be destroyed due to movements of the grinding wheel 4. This would be remedied by switching off the radius correction. However, this would mean that every time the grinding wheel radius is changed (so-called dressing), the entire CNC program would have to be recalculated. Furthermore, the safety mechanisms built into the CNC wet-grinding machine 1 would be rendered ineffective. This is not practicable for series production.

Figure 5A:
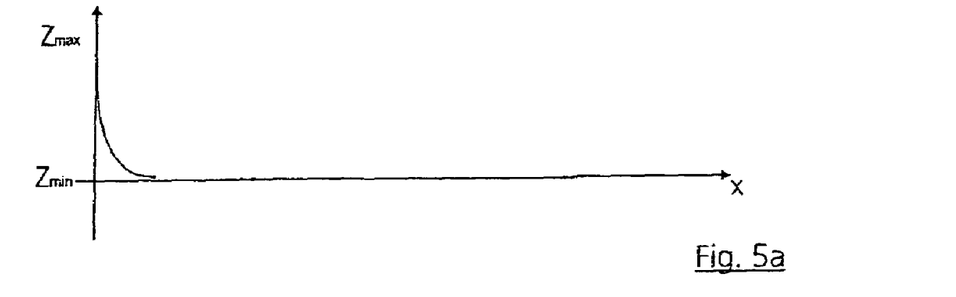
FIG. 5a shows a representation for center correction.
Figure 5B:
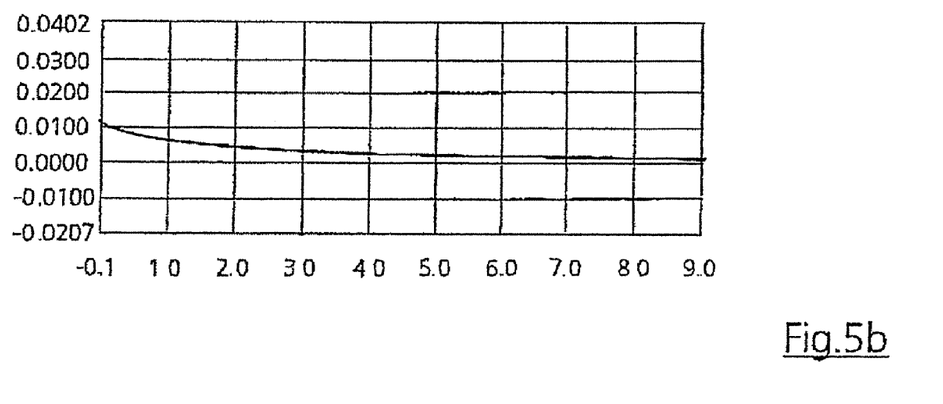
FIG. 5b shows a basic representation of an aspherical form with center elevations.

Accordingly, a correction possibility which achieves a kink-free profile of the aspherical form is now proposed. For this purpose, during the center correction a hyperbolic form is overlaid on the existing aspherical surface (see FIG. 5a). The final height in μm is prescribed as parameter $Z_{max}$ (generally the depth of the hole); the parameter $Z_{min}$ determines the remaining height of the correction. As already mentioned above, the entire height of the asphere is also overlaid, but only a small region in the center, the width of which is determined by the second parameter $Z_{min}$, is effective. By overlaying the entire surface area, it is ensured that there is no sudden change in the profile of the asphere. However, due to the machine resolution, only the small rising central region is effective in practice. This gives for the asphere to be overlaid the function $Z_{correction}=(Z_{min}*Z_{max}*\text{lens diameter}/2)/\text{lens diameter}/2*Z_{min}+x*(Z_{max}-Z_{min}))$; for x=0, it accordingly follows that $Z_{correction}=Z_{max}$. Such a central elevation with a smooth transition to the aspherical form for the correction of hole effects by the grinding wheel 4 is shown in FIG. 5b.

Figure 6:
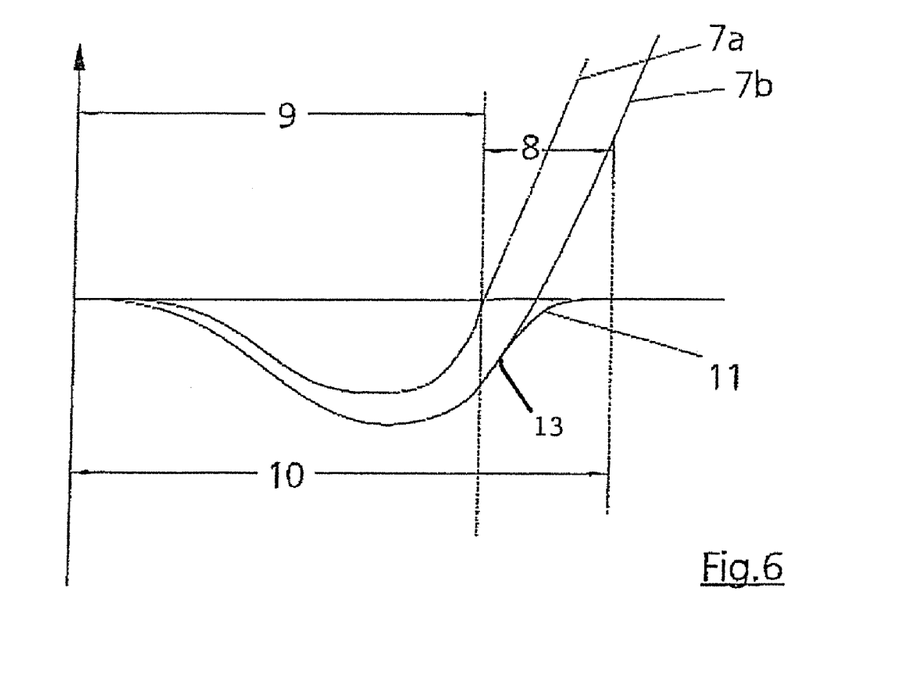
FIG. 6 shows a basic representation of the problem concerning the runout region of the aspherical form.

As evident from FIG. 6, aspheres 7a, 7b have a gradient which generally rises very steeply in the edge region, i.e. in their runout 8, which may lead to problems during machining. In the present exemplary embodiment, it is therefore attempted to make the runout 8 flatter and smoother. When forming the runout 8, allowance must be made for achieving a kink-free transition, i.e. the transition from a useful region 9 of the aspheres 7a, 7b to the runout region 8 must have a steadily differentiable form. A lens height 10 is divided into the useful region 9 and the runout region 8. In FIG. 6, such a flat kink-free runout 11 of the asphere 7b is sketched showing that the gradient of asphere 7b includes a portion in its runout region 8 which, after an inflection point 13, decreases with increasing radius. This is realized by a corresponding polynomial equation with splines. In further exemplary embodiments, this can also be realized by means of other mathematical functions (circles etc.). Sudden changes at the transition would lead to the CNC wet-grinding machine 1 detecting these as errors and immediately stopping the machining.

Figure 7:
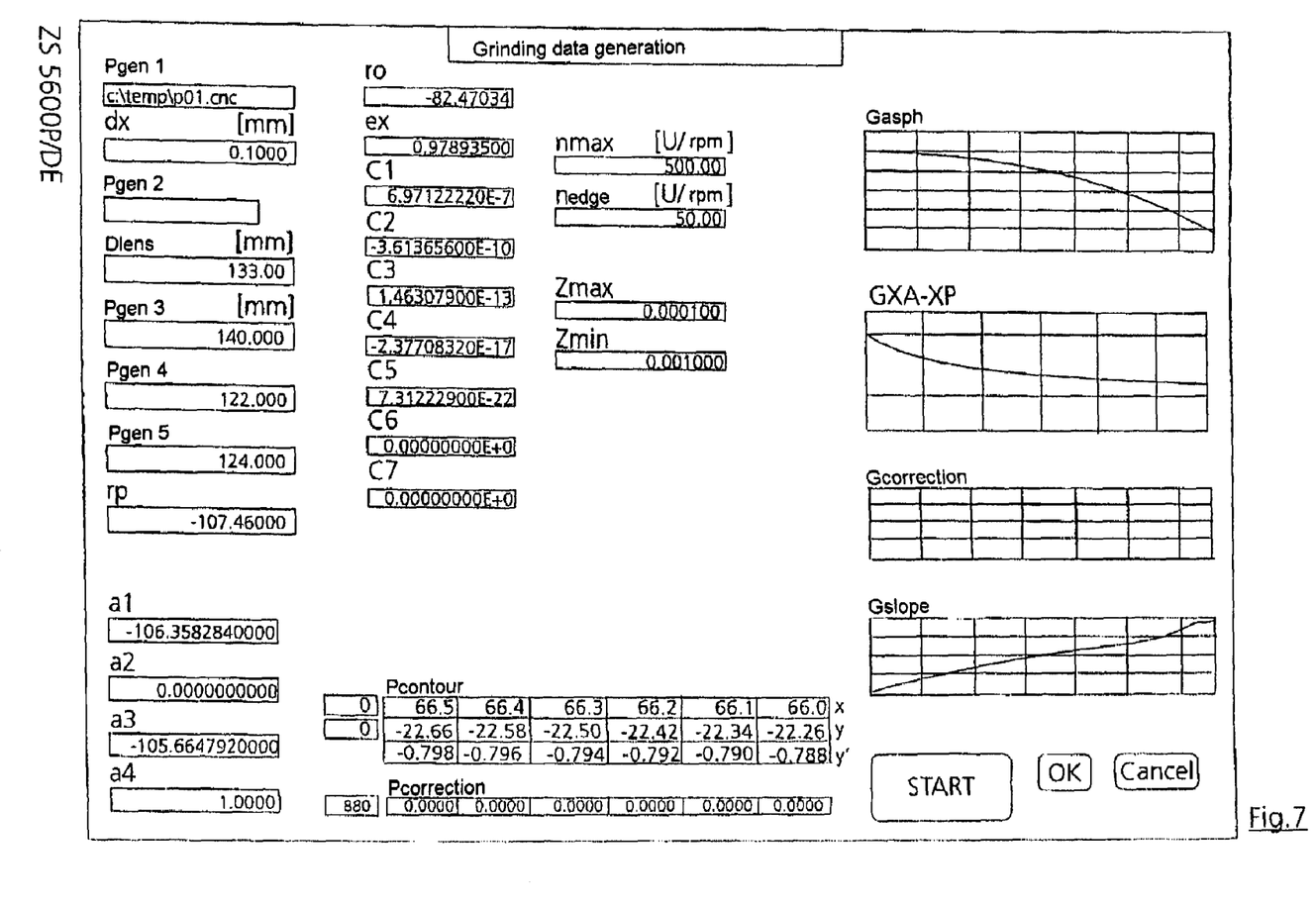
FIG. 7 shows a basic representation of a user interface of a computer program which implements the program-controlled NC data generating method according to the invention.

In the present exemplary embodiment, four coefficients $a_1$ to $a_4$ are available for the overlaying of a runout. They allow profiles with splines, polynomials and circles. A kink-free connection to the asphere profile must take place here. A separate computer program may generally be required for the determination of the parameters $a_1$ to $a_4$. In the present exemplary embodiment, the user can generate a kink-free runout online under graphics control. When parameters are input and modified, the effects on the curvatures and on the profile of the asphere in the edge region can be seen immediately. (See FIG. 7). There is consequently the possibility of determining runout parameters and calculating a runout overlay $Z_{runout}$ without a separate computing program, as follows:

$$Z_{runout}=a1*(x-h_{free})^3+a2*(x-h_{free})^4+a3*(x-h_{free})^5+a4*(x-h_{free})^6;$$

with $h_{free}$=x value at the beginning of the runout and with polynomial coefficients $a_1$ to $a_4$.

FIG. 7 shows a user interface for the input of all the necessary data or for generating the NC data according to method steps A to K of the computer program from FIG. 2. Optionally, existing correction files may be read in (steps C to E). The general data that are to be input include the file name Pgen1 of the file with the CNC machine-specific data, the path point spacing dx and the identity number Pgen2 of the workpiece 6. Geometric data that are to be input are the lens diameter dlens, the working range Pgen3, the free diameter Pgen4 and the overrun of the diameter Pgen5. The aspherical form is described by the parameters of the best-fit circle radius rp, the vertex curvature radius ro, the eccentricity ex and the coefficients c1 to c7. The path advancement can be selected by means of the parameters of the center speed nmax and the edge speed nedge. The center correction takes place by means of the correction values Zmax and Zmin. Runout parameters, i.e. polynomial coefficients a1 to a4, can likewise be selected. Furthermore, the aspherical form can be checked with the aid of the arrow height values Pcontour, where x is the coordinate axis, y is the associated arrow height and y' is its derivative. The graphic representations of the curves corresponding to the data input, asphere contour Gasph, XA-XP asphericity (difference between asphere and best-fit circle) GXA-XP, correction data Gcorrection and slope profile of the asphere Gslope, are newly calculated online when there is a change in an input value, and are displayed or updated. When the OK button is actuated, the data input are stored; actuation of the cancel button ends the program. The algorithmic calculation of the asphere contour from the parameter input is shown below on the basis of an aspherical lens to be produced (in pseudocode syntax—similar to the programming language C), with the above designations of the variables being used.

The calculation takes place in a loop for each index value I with the previously input path point spacing dx.

Current x value from the edge of the lens to the center (current asphere height as it were):

$$x=(d\text{lens}/2)-I*dx;$$

Asphere equation (standard equation):

$$z=x^2/(ro+\text{sign}(ro)*\text{sqrt}(ro^2-(1-ex)*x^2))+c1*x^4+c2*x^6+c3*x^8+c4*x^{10}+c5*x^{12}+c6*x^{14}+c7*x^{16};$$

Calculate runout; if x>hfree, then:

Zrunout=(x>hfree/2)?(a1\*(x−hfree/2)^3+a2\*(x−hfree/2)^4+a3\*(x−hfree/2)^5+a4\*(x−hfree/2)^6): 0.0; z=z+Zrunout−fcorr; where fcorr here represents the correction data to be overlaid from the correction file.

Calculate center correction:

$$Z\max=(Z\max==0.0)?10e-7:Z\max;$$

$$Z\text{correction}=(Z\min*Z\max*d\text{lens}/2)/((d\text{lens}/2)*Z\min+x*(Z\max-Z\min));$$

$$z=z+Z\text{correction};$$

Best-fit circle arrow height (to indicate the XA-XP asphericity):

$$zp=z-x^2/(rp+\text{sign}(rp)*\text{sqrt}(rp^2-x^2));$$

Rotational speed of the spindle nspindle:

$$n\text{spindle}=(d\text{lens}*n\text{edge}/2)/((n\text{edge}/n\max)*d\text{lens}/2+x);$$

Advancing rate v:

$$v=(n\text{spindle}*dx==0)?1:n\text{spindle}*dx;$$

Derivation of the asphere (to indicate the slope):

$$fx=2*x/ro+\text{sign}(ro)*(ro^2-x^2+x^2*ex)^{(1/2)})-0.5*x^2*\text{sign}(ro)*(-2*x+2*x*ex)/fzw+fzw1;$$

with:

$$fzw=((ro+\text{sign}(ro)*(ro^2-x^2+x^2*ex)^{(1/2)})^2*(ro^2-x^2+x^2*ex)^{(1/2)});$$

$$fzw1=4*c1*x^3+6*c2*x^5+8*c3*x^7+10*c4*x^9+12*c5*x^{11}+14*c6*x^{13}+16*c7*x^{15};$$

following with runout:

$$fx=(x>h\text{free}/2)?fx+(3*a1*(x-h\text{free}/2)^2+4*a2*(x-h\text{free}/2)^3+5*a3*(x-h\text{free}/2)^4+6*a4*(x-h\text{free}/2)^5):fx;$$

The angle alpha1=atan(−fx) can also be used later during production.

After all the necessary data have been input, the NC data generation can be started by using the start button. The following generated NC data are added here by way of example.

P000001

N16 (A400S-NC-PROGRAM date: Tues, Feb. 25, 2003 20:55:11)

N18 (identity number of lens:)

N20 G90

N22 G40

N24 G92

N26 G01

N28 M5

N30 G10

\*N32 A18=129,A19=142

\*N34 P385=0

\*N36 P84=0.97893500

\*N38 P85=82.47034,P86=107.46000,P107=61.000

\*N40 P109=7,P101=0,P102=0.1000 P194=50

\*N42 P106=70.0000,P58=P106,P59=−P106

N44 Q2L0 (call input program)

\*N46 IF P385=111 GO 52

\*N48 IF P385=999 GO 9995

\*N50 GO 34

\*N52 P64=0,P89=100000,P395=1

\*N54 P390=P190,P391=191,P392=192,P393=194,P394=193

\*N56 P102+PP394

\*N58 P102=−ABS P102, IF PP392=1 DO P102=−P102

\*N60 P30=0.00000,P31=0.00000,P32=0.00000

\*N62 P36=0.00000

\*N64 P33=6650000.00000,P34=−2266207.47937,P35=28.71457

\*N66 P37=0.85023

\*N68 IF PP392=1 GO 74

\*N70 P30=−P33,P31=P34,P32=−P35,P36=−P37

\*N72 P33=0,P34=0,P35=0,P37=0

N74 Q321 L0 (call home coordinate calculation)

N76 A40.0000 F500

\*N78 IF PP392=2 GO 88

N80 G44M7D1X=P128Z=P129 (preliminary loops)

N82 G1X=P33 Z=P34 F100

\*N84 P1=P58,P8=PP393

\*N86 GO 94

N88 G44D2X=P126Z=P127 (fine grinding)

N90 G1X=P30 Z=P31 F100

\*N92 GO 94

\*N94 IF P385=888 GO 34

\*N96 GO 98

N98 G11 (fill buffer)

N100 G09 (LOOK AHEAD ON)

N102 G1 X66.40000 Z-22.58223 F5 S46 A40.0000

N104 X66.30000 Z-22.50259 F5 S46 A40.0000

N106 X66.20000 Z-22.42316 F5 S46 A40.0000

N108 X66.10000 Z-22.34394 F5 S46 A40.0000

N110 X66.00000 Z-22.26492 F5 S46 A40.0000

N112 X65.90000 Z-22.18611 F5 S46 A40.0000

N114 X65.80000 Z-22.10750 F5 S46 A40.0000

N116 X65.70000 Z-22.02909 F5 S46 A40.0000

N118 X65.60000 Z-21.95089 F5 S46 A40.0000

N120 X65.50000 Z-21.87289 F5 S46 A40.0000

N122 X65.40000 Z-21.79509 F5 S46 A40.0000

N124 X65.30000 Z-21.71750 F5 S46 A40.0000

N126 X65.20000 Z-21.64009 F5 S46 A40.0000

N128 X65.10000 Z-21.56289 F5 S46 A40.0000

N130 X65.00000 Z-21.48587 F5 S46 A40.0000

It should be noted that lines N22 to N98 describe the starting behavior specific to the type of machine and the lines from N100 describe the geometric NC data for the aspherical form.

Figure 8:
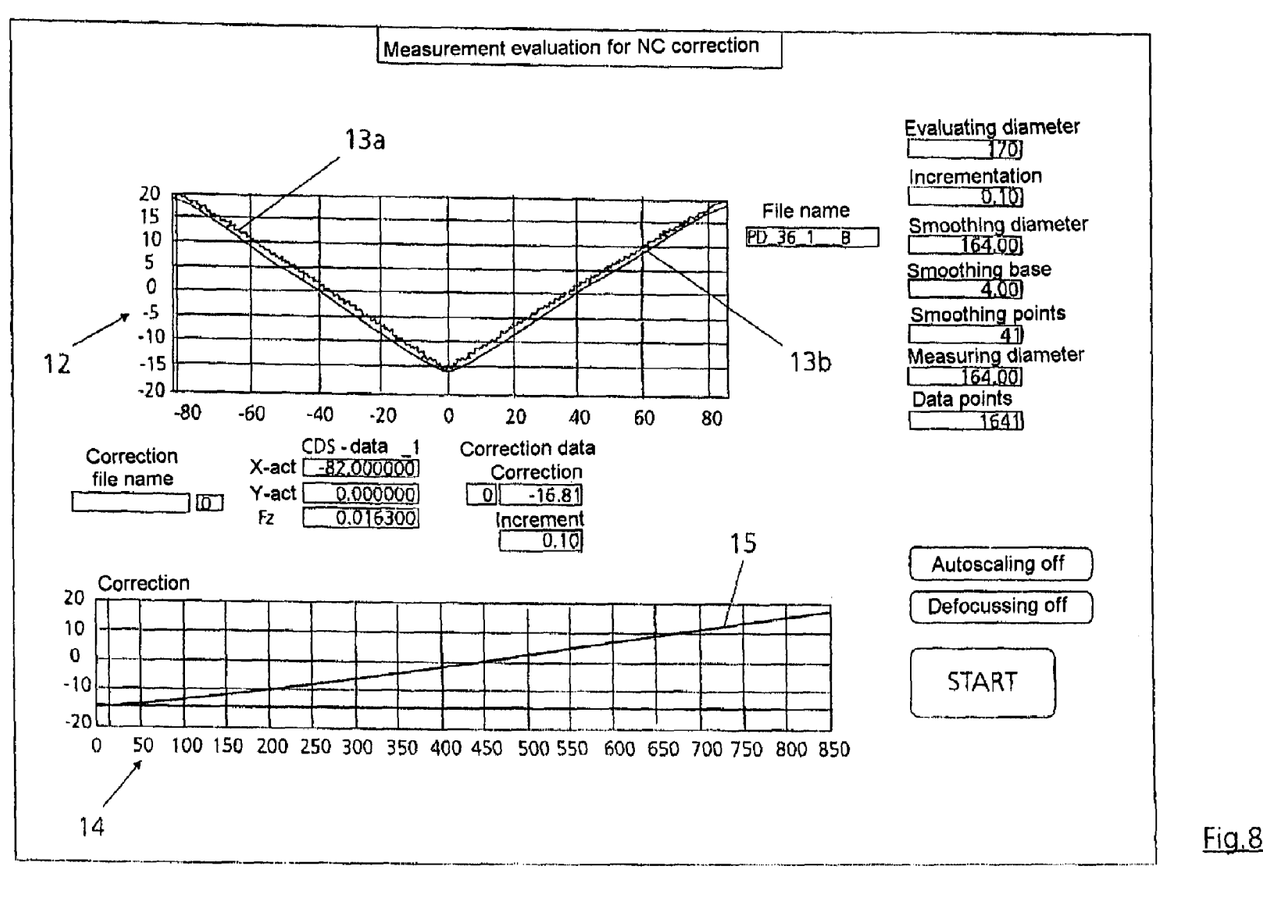
FIG. 8 shows a user interface for the display of the measured aspherical form and for the generation of a correction file.

A user interface of a program for measurement evaluation and creation of a correction overlay for NC data is represented in principle in FIG. 8. The measured values 13a for the error deviation of the workpiece 6 from its desired form (from the file PD__36__1___B), determined by a precision coordinate measuring device, can be displayed in a graphic display 12, and data 15 (which can likewise be graphically presented in a display 14) for the related correction overlay can be determined. Smoothed measured values 13b can be considered in parallel. Subsequently, a correction file can be stored under a correction file name for later use during the NC grinding data generation by actuating the start button. By actuating the corresponding buttons, the autoscaling and the de-focusing can be switched on and off.

The program-controlled NC data generating method according to the invention can be used in an advantageous way for all CNC wet-grinding machines of the companies LOH/Schneider.

What is claimed is:

1. A method for producing an aspherical optical element from a workpiece using a computer numerically controlled (CNC) machine of the type having a grinding tool movable relative to the workpiece under program control in accordance with numerical control data, said method comprising the steps of:
   (a) inputting numerical control data which includes parameters representing the desired aspherical form of an aspherical optical element;
   (b) calculating correction data based on a correction function;
   (c) overlaying said numerical control data with said correction data over at least a central portion of said surface of said aspherical form to produce corrected numerical control data; and
   (d) moving the grinding tool under program control relative to the workpiece based on said corrected numerical control data to produce said aspherical optical element from the workpiece.

2. The method of claim 1 wherein said numerical control data is overlaid with said correction data over the entirety of said surface of said aspherical form, whereby sudden changes in the profile of said aspherical optical element are avoided.

3. The method of claim 1 wherein said correction function is a function, Zcorrection, of the form:

$$Z_{correction} = \frac{(Z_{min} * Z_{max} * D/2)}{(D/2 * Z_{min} + x * (Z_{max} - Z_{min}))}$$

where:
   D is the diameter of said aspherical optical element;
   $Z_{min}$ is a constant representing a minimum correction height at which the overlaying is still effective;
   $Z_{max}$ is a constant representing a maximum correction height in said surface of said aspherical form; and
   x is a parameter representing radial distance from the center of said aspherical optical element.

4. A method for producing an aspherical optical element from a workpiece using a computer numerically controlled (CNC) machine of the type having a grinding tool movable relative to the workpiece under program control in accordance with numerical control data, said method comprising the steps of:
   (a) inputting numerical control data which includes parameters representing the aspherical form of an aspherical optical element, said form having a surface which includes a useful region and a runout region located radially outside said useful region;
   (b) overlaying said numerical control data with correction data to produce corrected numerical control data, said correction data being calculated based on a correction function selected such that said runout region, as defined by said corrected numerical control data, is flattened; and
   (c) moving the grinding tool relative to the workpiece under program control based on said corrected numerical control data to form said aspherical optical element from the workpiece, whereby said aspherical optical element is formed having a flattened runout region.

5. The method of claim 4 wherein said function is further selected such that said runout region, is connected to said useful region by way of a kink-free transition.

6. The method of claim 5 wherein said function is a function selected from the group consisting of a circle, a spline and a polynomial.

7. The method of claim 4 wherein said function is a function, $Z_{runout}$, of the form:

$$Z_{runout} = a_1 * (x-h_{free})^3 + a_2 * (x-h_{free})^4 + a_3 * (x-h_{free})^5 + a_4 * (x-h_{free})^5$$

where:
   $a_1, a_2, a_3$ and $a_4$ are polynomial coefficients;
   x is a variable representing the radial distance from the center of said aspherical optical element; and
   $h_{free}$ is the value of x corresponding to the beginning of said region.

8. A method for producing an aspherical optical element from a workpiece using a computer numerically controlled (CNC) machine of the type having a grinding tool movable relative to the workpiece under program control in accordance with numerical control data, said method comprising the steps of:
   (a) inputting numerical control data which includes parameters representing the desired aspherical form of an aspherical optical element;
   (b) calculating correction data based on a correction function;
   (c) overlaying said numerical control data with said correction data over at least a central portion of said surface of said aspherical form to produce corrected numerical control data;
   (d) rotationally driving the workpiece at a rotational speed in accordance with a hyperbolic spindle speed function such that said rotational speed increases with the distance to the center of said workpiece decreasing; and
(e) moving the grinding tool under program control relative to the workpiece based on said corrected numerical control data to produce said aspherical optical element from the workpiece.

9. The method of claim 8 wherein said numerical control data is overlaid with said correction data over the entirety of said surface of said aspherical form, whereby sudden changes in the profile of said aspherical optical element are avoided.

10. The method of claim 8 wherein said correction function is a function, Zcorrection, of the form:

$$Z_{correction} = \frac{(Z_{min} * Z_{max} * D/2)}{(D/2 * Z_{min} + x * (Z_{max} - Z_{min}))}$$

$Z_{correction} = (Z_{min}*Z_{max}*D/2)$
$(D/2*Z_{min}+x*(Z_{max}-Z_{min}))$ where:
D is the diameter of said aspherical optical element;
$Z_{min}$ is a constant;
$Z_{max}$ is a constant; and
x is a parameter representing radial distance from the center of said aspherical optical element.

11. The method of claim 8 wherein said spindle speed function is a function, $n_{spindle}$, of the form:

$n_{spindle}=(D*n_{edge}/2)/((n_{edge}/n_{max}*D/2+x)$ where:
D is the diameter of the aspherical optical element;
$n_{edge}$ is said rotational speed at the edge of the workpiece;
$n_{max}$ is said rotational speed at the center of the workpiece; and
x is a parameter representing the radial distance from the center of said aspherical optical element.

12. A method for producing an aspherical optical element from a workpiece using a computer numerically controlled (CNC) machine of the type having a grinding tool movable relative to the workpiece under program control in accordance with numerical control data, said method comprising the steps of:
(a) inputting numerical control data which includes parameters representing the aspherical form of an aspherical optical element, said form having a surface which includes a useful region and a runout region located radially outside said useful region;
(b) overlaying said numerical control data with correction data to produce corrected numerical control data, said correction data being calculated based on a correction function selected such that said runout region, as defined by said corrected numerical control data, is flattened;
(c) rotationally driving said grinding tool at a substantially constant rotational speed and rotationally driving the workpiece at a rotational speed in accordance with a hyperbolic spindle speed function such that said rotational speed increases with the distance to the center of said workpiece decreasing; and
(d) moving the grinding tool relative to the workpiece under program control based on said numerical control data to form said aspherical optical element from the workpiece, whereby said aspherical optical element is formed having a flattened runout region.

13. The method of claim 12 wherein said function is further selected such that said runout region, is connected to said useful region by way of a kink-free transition.

14. The method of claim 13 wherein said function is a function selected from the group consisting of a circle, a spline and a polynomial.

15. The method of claim 12 wherein said correction function is a function, $Z_{runout}$, of the form:

$Z_{runout}=a_1*(x-h_{free})^3+a_2*(x-h_{free})^4+a_3*(x-h_{free})^5+a_4*(x-h_{free})^5$ where:
$a_1$, $a_2$, $a_3$ and $a_4$ are polynomial coefficients;
x is a variable representing the radial distance from the center of said aspherical optical element; and
$h_{free}$ is the value of x corresponding to the beginning of said region.

16. The method of claim 12 wherein said spindle speed function is a function, nspindle, of the form:

nspindle=$(D*n_{edge}/2)/((n_{edge}/n_{max}*D/2+x)$ where:
D is said diameter of the aspherical optical element;
$n_{edge}$ is said rotational speed at the edge of the workpiece;
$n_{max}$ is the rotational speed at the center of the workpiece; and
x is a parameter representing the radial distance from the center of said aspherical optical element.

17. A method for producing an aspherical optical element from a workpiece using a computer numerically controlled (CNC) machine of the type having a grinding tool movable relative to the workpiece under program control in accordance with numerical control data, said method comprising the steps of:
(a) inputting numerical control data which includes parameters representing the aspherical form of an aspherical optical element, said form having a surface which includes a useful region and a runout region located radially outside said useful region;
(b) calculating first correction data based on a first correction function;
(c) calculating second correction data based on a second correction function;
(d) overlaying said numerical control data with said first correction data and said second correction data to produce corrected numerical control data, said second correction function being a function selected such that said runout region, as defined by said corrected numerical control data, is flattened; and
(e) moving the grinding tool relative to the workpiece under program control based on said corrected numerical control data to form said aspherical optical element from the workpiece.

18. The method of claim 17 wherein said second correction function is further selected such that said runout region, is connected to said useful region by way of a kink-free transition.

19. The method of claim 18 wherein said second correction function is a function selected from the group consisting of a circle, a spline and a polynomial.

20. The method of claim 17 wherein said second correction function is a function, $Z_{runout}$, of the form:

$Z_{runout}=a_1*(x-h_{free})^3+a_2*(x-h_{free})^4+a_3*(x-h_{free})^5+a_4*(x-h_{free})^5$ where:
$a_1$, $a_2$, $a_3$ and $a_4$ are polynomial coefficients;

x is a variable representing the radial distance from the center of said aspherical optical element; and $h_{free}$ is the value of x corresponding to the beginning of said region.

21. The method of claim 17 wherein said numerical control data is overlaid with said first correction data over the entirety of said surface of said aspherical form, whereby sudden changes in the profile of said aspherical optical element are avoided.

22. The method of claim 17 wherein said first correction function is a function, Zcorrection, of the form:

$$Z_{correction} = \frac{(Z_{min} * Z_{max} * D/2)}{(D/2 * Z_{min} + x * (Z_{max} - Z_{min}))}.$$

$Z_{correction} = (Z_{min}*Z_{max}*D/2)$
$(D/2*Z_{min}+x*(Z_{max}-Z_{min}))$ where:

D is the diameter of said aspherical optical element;

$Z_{min}$ is a constant representing a minimum correction height at which the overlaying is still effective;

$Z_{max}$ is a constant representing a maximum correction height in said surface of said aspherical form; and x is a parameter representing radial distance from the center of said aspherical optical element.

23. The method of claim 17 further comprising the step of rotationally driving the workpiece at a rotational speed in accordance with a hyperbolic spindle speed function such that said rotational speed increases with the distance to the center of the workpiece decreasing.

24. The method of claim 23 wherein said spindle speed function is a function, $n_{spindle}$, of the form:

$n_{spindle}=(D*n_{edge}/2)/((n_{edge}/n_{max}*D/2+x)$ where:

D is the diameter of the aspherical optical element;

$n_{edge}$ is said rotational speed at the edge of the workpiece;

$n_{max}$ is said rotational speed at the center of the workpiece, and x is a parameter representing the radial distance from the center of said aspherical optical element.

25. A method for producing an aspherical optical element from a workpiece using a computer numerically controlled (CNC) machine of the type having a grinding tool movable relative to the workpiece under program control in accordance with numerical control data, said method comprising the steps of:

(a) inputting numerical control data which includes parameters representing the aspherical form of an aspherical optical element, said form having a surface which includes a useful region and a runout region located radially outside said useful region, said runout region having a gradient which increases with increasing radius;

(b) overlaying said numerical control data with correction data to produce corrected numerical control data, said correction data being calculated based on a correction function selected such that said runout region, as defined by said corrected numerical control data, is flattened, at least part of said runout region having a gradient which decreases with increasing radius, wherein an inflection point is located within said runout region; and (c) moving the grinding tool under program control relative to the workpiece based on said corrected numerical control data to form said aspherical optical element from the workpiece.

* * * * *

UNITED STATES PATENT AND TRADEMARK OFFICE
CERTIFICATE OF CORRECTION

PATENT NO. : 7,164,964 B2
APPLICATION NO. : 10/874070
DATED : January 16, 2007
INVENTOR(S) : Siegfried Stacklies It is certified that error appears in the above-identified patent and that said Letters Patent is hereby corrected as shown below:

On the title page
"Siegfried Stacklies, Brucknerweg (DE)" should read:

--Siegfried Stacklies, Abtsgmuend (DE)--

Column 8, line 17:
delete the superfluous space:
"*N54      P390"
--*N54 P390--

Column 8, line 26:
delete the superfluous space:
"*N64      P33"
--*N64 P33--

Claim 3, Column 10, the formula appears twice, delete the second formula on lines 1 and 2

$$\text{``} Z_{correction} = \frac{(Z_{min} * Z_{max} * D/2)}{(D/2 * Z_{min} + x * (Z_{max} - Z_{min}))} \text{''}$$

Claim 10, Column 11, the formula appears twice, delete the second formula on lines 20 and 21

$$\text{``} Z_{correction} = \frac{(Z_{min} * Z_{max} * D/2)}{(D/2 * Z_{min} + x * (Z_{max} - Z_{min}))} \text{''}$$

UNITED STATES PATENT AND TRADEMARK OFFICE
CERTIFICATE OF CORRECTION

PATENT NO.        : 7,164,964 B2
APPLICATION NO.   : 10/874070
DATED             : January 16, 2007
INVENTOR(S)       : Siegfried Stacklies

It is certified that error appears in the above-identified patent and that said Letters Patent is hereby corrected as shown below:

Claim 22, Column 13, the formula appears twice, delete the second formula on lines 18 and 19

$$\text{``}Z_{correction} = \frac{(Z_{min} * Z_{max} * D/2)}{(D/2 * Z_{min} + x * (Z_{max} - Z_{min}))}\text{''}$$

Signed and Sealed this

Twenty-first Day of August, 2007

JON W. DUDAS
*Director of the United States Patent and Trademark Office*